United States Patent [19]

Fasching

[11] Patent Number: 5,163,754
[45] Date of Patent: Nov. 17, 1992

[54] ISOLATED THERMOCOUPLE AMPLIFIER SYSTEM FOR STIRRED FIXED-BED GASIFIER

[75] Inventor: George E. Fasching, Morgantown, W. Va.

[73] Assignee: The United States of America as represented by the United States Department of Energy, Washington, D.C.

[21] Appl. No.: 390,781

[22] Filed: Aug. 8, 1989

[51] Int. Cl.⁵ .......................... G01K 1/02; G01K 7/14; G01K 3/00
[52] U.S. Cl. .................................. 374/137; 374/141; 374/166
[58] Field of Search .................. 374/137, 141, 166

[56] References Cited

U.S. PATENT DOCUMENTS

| | | | |
|---|---|---|---|
| 3,946,364 | 3/1976 | Codomo et al. | 374/102 |
| 3,995,485 | 12/1976 | Beyer et al. | 374/34 |
| 4,466,747 | 8/1984 | Fasching | 374/101 |
| 4,699,519 | 10/1987 | Persson | 374/166 |
| 4,944,035 | 7/1990 | Aagardl et al. | 374/44 |

FOREIGN PATENT DOCUMENTS 0003019 1/1982 Japan .................. 374/141
2185110 7/1987 United Kingdom .......... 374/141

Primary Examiner—Allan N. Shoap
Assistant Examiner—Diego F. F. Gutierrez
Attorney, Agent, or Firm—David E. Breeden; Stephen D. Hamel; William R. Moser

[57] ABSTRACT

A sensing system is provided for determining the bed temperature profile of the bed of a stirred, fixed-bed gasifier including a plurality of temperature sensors for sensing the bed temperature at different levels, a transmitter for transmitting data based on the outputs of the sensors to a remote operator's station, and a battery-based power supply. The system includes an isolation amplifier system comprising a plurality of isolation amplifier circuits for amplifying the outputs of the individual sensors. The isolation amplifier circuits each comprise an isolation operational amplifier connected to a sensor; a first "flying capacitor" circuit for, in operation, controlling the application of power from the power supply to the isolation amplifier; an output sample and hold circuit connected to the transmitter; a second "flying capacitor" circuit for, in operation, controlling the transfer of the output of the isolation amplifier to the sample and hold circuit; and a timing and control circuit for activating the first and second capacitor circuits in a predetermined timed sequence.

20 Claims, 3 Drawing Sheets

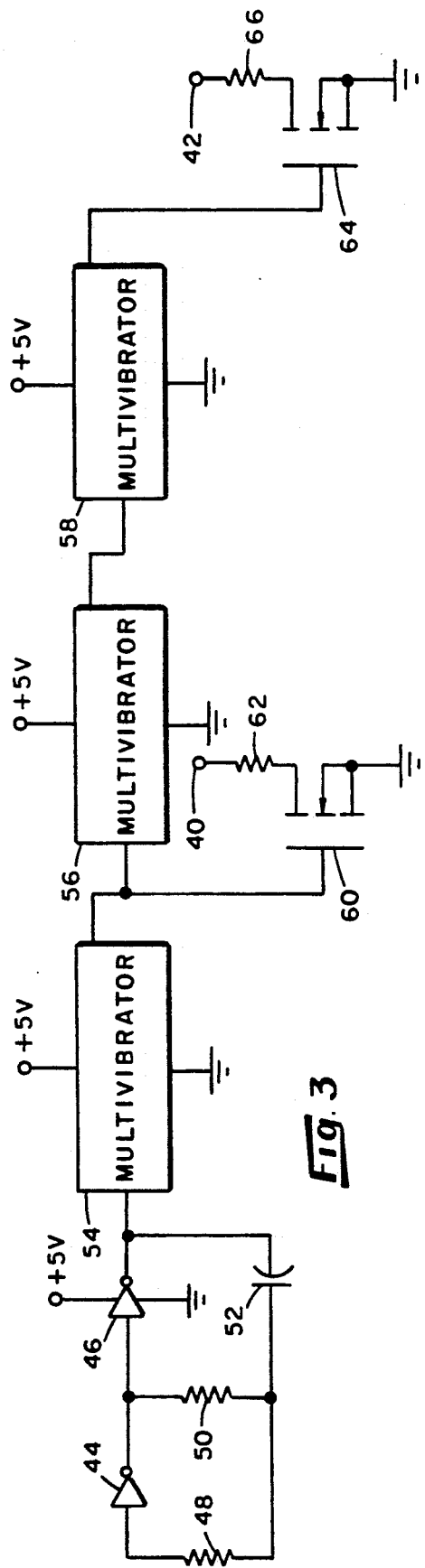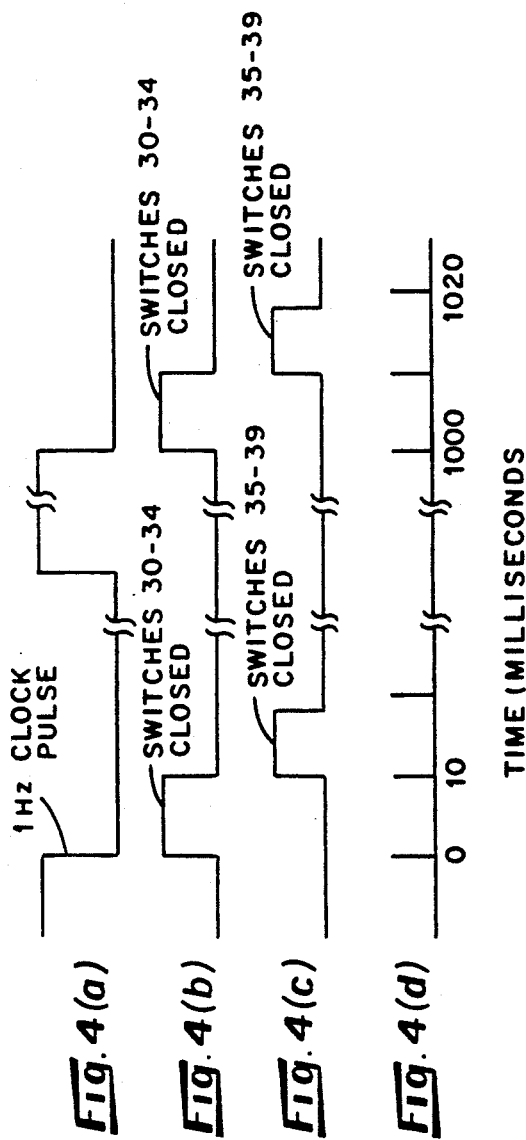

ISOLATED THERMOCOUPLE AMPLIFIER SYSTEM FOR STIRRED FIXED-BED GASIFIER

FIELD OF THE INVENTION

The present invention relates generally to stirred, fixed bed gasifier reactors and, more particularly, to temperature sensing systems for determining the temperature profile of the gasifier bed of such reactors.

BACKGROUND OF THE INVENTION

The bed temperature profile of stirred, fixed-bed gasifier is conventionally obtained using a plurality of ungrounded thermocouples mounted in the arms of the stirrer. The stirrer moves up and down through the bed in a helical manner through all zones or layers, from an ash layer at the bottom, a fire zone, a devolatilization zone, and a raw coal layer at the top. As is explained in more detail hereinbelow, the lower part or layer of the solids bed consists of ash (reacted coal) and this layer must be maintained at a sufficient height above the grate of the gasifier to prevent grate burnout by the high reaction temperatures just above the ash layer. The thickness of the ash layer is controlled by rotation of the grate and the thermocouples referred to above are used to determine the temperatures within the bed, it being understood that the temperatures of the ash layer are much lower than that of the bed reactor layer (fire zone) immediately thereabove. By knowing the vertical positions of the stirrer arms and the temperature outputs of the thermocouples carried thereby, the thickness of the ash layer can be determined.

The corrosive hot environment within the bed occasionally causes a thermocouple to fail, e.g., by shorting to ground. This type of failure produces an overvoltage in the amplifier circuit which, in turn, drives the data link out of synchronization. In a typical system, a multiplexed FM/FM telemetry (wireless) data link is used and because of the loss of synchronism all bed temperature data is rendered useless due to the resultant garbling of the data.

A further problem with, or demand made on, such systems is that the thermocouple amplifier must be operated by a battery over long continuous time periods. Commercially available isolated amplifiers, such as the Burr-Brown Iso100AP isolation amplifier and 0722 DC/DC converter require 40 mA for each amplifier and for six amplifiers (corresponding to the number of thermocouples typically used), the total is 240 mA. This obviously would provide very high loading of the (typically 24-volt) battery employed in these systems particularly considering that the battery is required to operate continuously for long periods, e.g., 6 weeks.

SUMMARY OF THE INVENTION

In accordance with the invention, a highly power efficient isolated amplifier is provided for temperature sensor applications such as those describe above wherein extended battery operation is required.

In a preferred embodiment, the invention is incorporated in a sensing system for determining the bed temperature profile of the bed of a stirred, fixed-bed gasifier wherein the sensing system includes a plurality of temperature sensors for sensing the bed temperature at different levels therein, transmitter means for transmitting data based on the outputs of the sensors to a remote control operator's station and a battery-based power supply for powering the system, and concerns an isolation amplifier system for amplifying the outputs of the temperature sensors. The isolation amplifier system comprises a plurality of isolation amplifier circuits and the isolation amplifier circuits each comprise an isolation amplifier connected to a sensor, first capacitor means for, in operation, controlling the application of power from the power supply to the isolation amplifier, output sample and hold means connected to the transmitter means, second capacitor means for, in operation, controlling the transfer of the output of the isolation amplifier to the sample and hold means, and timing and control means for activating the first and second capacitor means in a predetermined timed sequence.

Preferably, the isolation amplifier comprises an operational amplifier having first and second power inputs and the first capacitor means comprises a first capacitor included in a power circuit connected between the power inputs of the operational amplifier and switching means, controlled by the timing and control means, for controlling opening and closing of the power circuit.

The second capacitor means preferably comprises a second capacitor connected in a further circuit connected between the operational amplifier and the sample and hold means in shunt with the output of said operational amplifier, and further switching means, controlled by the timing and control means, for controlling opening and closing of the further circuit.

The sample and hold means advantageously comprises a further operational amplifier and a hold capacitor connected to one input of the further operational amplifier.

In accordance with an important feature of the invention, the switching means associated with the first capacitor means includes a switch, connected to ground in shunt with the hold capacitor, for bypassing to ground any charge on the hold capacitor produced by a switching transient.

According to a further important feature of the invention, the timing and control means comprises means for generating a low duty cycle pulse which determines the time period during which power is applied to the isolation amplifier.

Each of said switching means preferably comprises a light activated electronic switch controlled by a light source activated by said timing and control means. In particular, in accordance with an advantageous embodiment, the light activated switch comprises a light-activated field effect transistor and the light source comprises a light emitting diode.

Other features and advantages of the invention will be set forth in, or apparent from, the following detailed description of preferred embodiments of the invention.

BRIEF DESCRIPTION OF THE DRAWINGS

FIG. 3 is a schematic circuit diagram of a timing and control circuit for the isolated thermocouple amplifier of FIG. 2; and FIGS. 4(a) to 4(d) are timing waveforms associated with the circuits of FIGS. 2 and 3.

DESCRIPTION OF THE PREFERRED EMBODIMENTS

Figure 1:
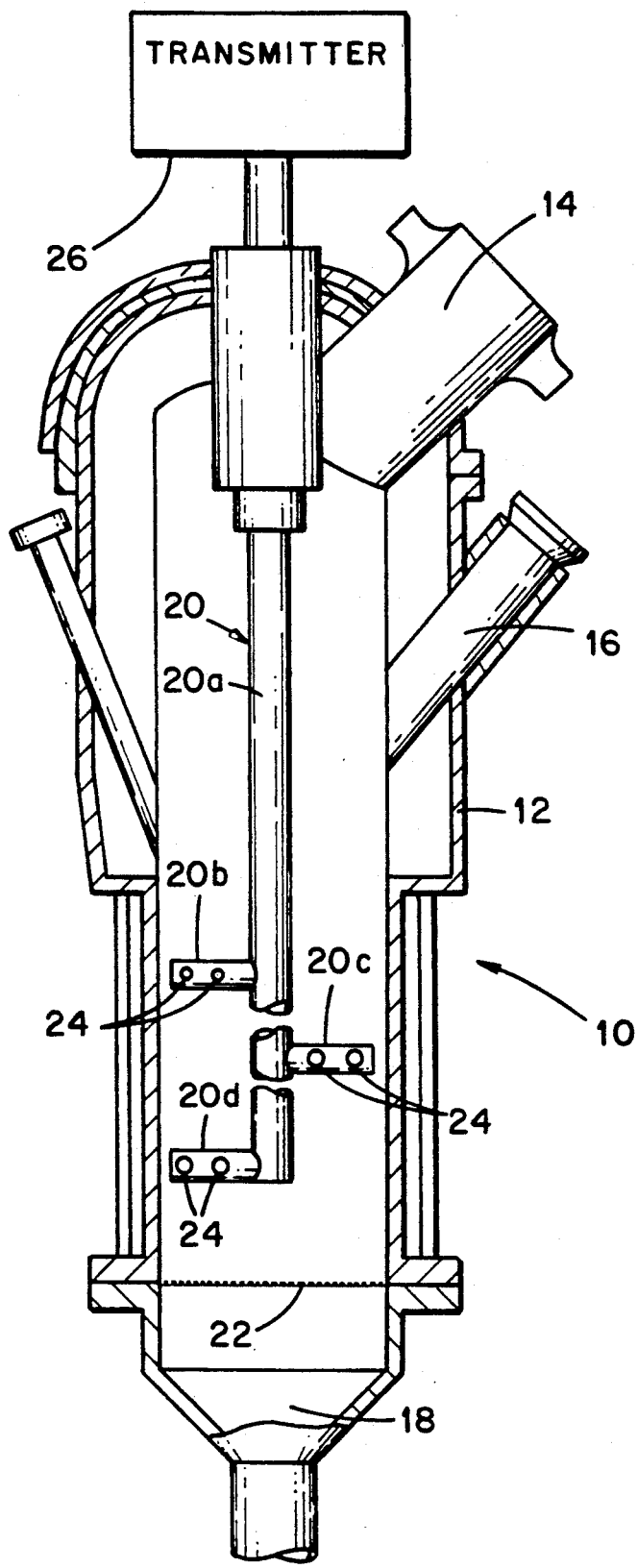
FIG. 1 is a highly schematic side view, partially in cross section, of a gasifier reactor including thermocouple sensors for sensing reactor bed temperatures.

Referring to FIG. 1, a schematic side view, partially in cross section, is shown of a standard gasifier reactor of the general type in which the invention is to be employed. It will be understood that the invention is not limited in application to the gasifier reactor illustrated and that the details of the reactor are not important to an understanding of, and form no part of, the invention.

The gasifier reactor shown in FIG. 1, which is generally denoted 10, is a 42" fixed bed gasifier reactor and comprises, as the major components thereof, a containment vessel 12 including a producer gas outlet port 14, a coal inlet port 16, and a bottom port 18 for ash outlet and air-steam inlet; a stirrer 20; and a grate 22. During normal operation, coal is batch fed into the reactor 10 through port 16 and reacts with air-steam continuously fed from the bottom port 18, through the grate 22, to form a product mixture, comprising nitrogen, carbon monoxide, hydrogen, carbon dioxide, hydrogen sulfide, and other minor components. The product mixture exits through the gas outlet port 14.

The stirrer 20 includes a vertically extending shaft 20a with three stirrer arms, 20b, 20c and 20d, spaced therealong, and is rotated continuously while being reciprocated up and down to stir the bed with the three stirrer arms. The stirrer 20 thus traces out a generally helical path, in passing through the various zones of the reactor bed. In operation, the level of the reactor bed (the solids) is maintained just below the coal inlet port 16 (79" above the grate 22 in the exemplary embodiment under consideration) by regulating the batch rate of coal feed through port 16. As discussed above, the lower part of the solids bed comprises ash (reacted coal) and must be maintained at a sufficient level above the grate 22 to prevent grate burnout by the high reaction temperatures just above the ash layer. The ash layer thickness is controlled by rotation of grate 22 (i.e., ash is removed by grate rotation).

In order to determine the thickness of the ash layer, thermocouples 24 are mounted on each of the stirrer arms, viz., on arms 20b, 20c and 20d, in the exemplary embodiment illustrated. As the stirrer 20 rotates and moves up and down, the temperatures within the bed are sensed by thermocouples 24 and are displayed using the system described below. Because the temperature of the ash layer is typically much lower than the temperature of the bed reaction layer located immediately thereabove, operating personnel for the gasifier can readily determine the ash layer thickness based on the stirrer arm temperatures (bed temperatures) sensed by the thermocouples 24 and the corresponding vertical position of the associated stirrer arm on which the individual thermocouples 24 are located.

A battery operated FM/FM telemetry system (transmitter) 26 mounted at the upper end of stirrer shaft 20a is used to transmit the bed temperatures detected by the thermocouples 24 to a remote operator's control panel (not shown). As is discussed in more detail below, the battery operated, isolated amplifiers of the present invention are used in the telemetry system 26 to amplify the low level signals of the thermocouples 24.

As mentioned above, the high temperature corrosive environment in the bed within reactor 10 occasionally causes failure, such as a short circuit to ground, of a thermocouple 24. This type of failure produces an overvoltage output in the thermocouple amplifier of a conventional telemetry system which, in turn, drives the telemetry data link represented at 26 out of synchronization. When this happens all bed temperature data obtained from thermocouples 24 is rendered useless because of the resultant garbling. As discussed hereinbefore, the isolation amplifier system of the present invention overcomes this problem while enabling battery operation over long continuous periods.

Figure 2:
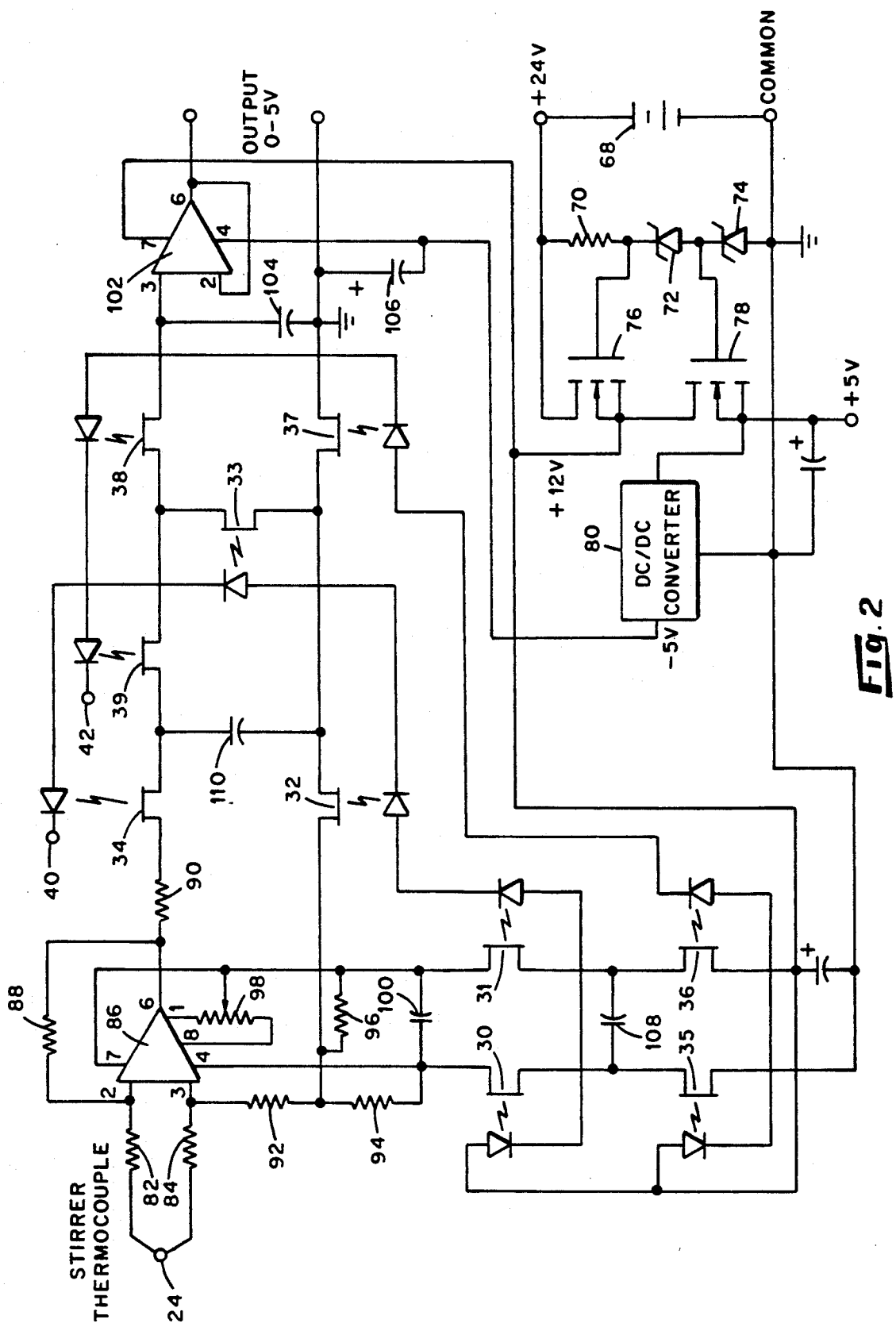
FIG. 2 is a schematic circuit diagram of the isolated thermocouple amplifier for isolating and amplifying the output signals produced by the thermocouple sensors of FIG. 1.

Referring to FIGS. 2 and 3, there are respectively illustrated one isolated amplifier circuit of the isolated thermocouple amplifier system (the others are substantially identical), and the timing and control circuit therefor. The amplifier system of FIG. 2 includes two groups of optical (LED activated) field effect transistor switches, viz., switches 30 to 34 and switches 35 to 39. The switching operation of the two groups is based on two switch timing pulses produced by the timing and control circuit of FIG. 2, the output terminals 40 and 42 of which are respectively connected to the input light emitting diodes of the optical FET switches of the respective groups.

Before further considering FIG. 2, it will be seen, referring to FIG. 3, that the timing and control circuit comprises a clock or oscillator circuit, comprising inverters 44 and 46, shunt resistors 48 and 50 and capacitor 52, which forms an input to the first of three monostable multivibrator circuits 54, 56 and 58. The output of multivibrator 54 is connected to output terminal 40 through a transistor LED driver 60 and a resistor 62, and to an input of the second multivibrator 56, the output of which forms the input to the third multivibrator 58. The output of the latter is connected through a transistor LED driver 64 and a resistor 66 to output terminal 42.

Referring again to FIG. 2, the power supply circuit for the illustrated amplifier system includes a twenty-four volt battery 68 having a resistor 70 and a pair of zener diodes 72 and 74 connected in series thereacross as shown. The junction between resistor 70 and zener diode 72 is connected to a first high efficiency voltage regulator 76 which provides a regulated +12 volts while the junction between zener diodes 72 and 74 is connected to a second high efficiency voltage regulator 78 which provides a regulated +5 volts. A low loss DC/DC converter 80 connected to voltage regulator 78 converts the +5 volts at the output of the latter into −5 volts DC.

A stirrer thermocouple 24, corresponding to one of the thermocouples of FIG. 1, is connected through resistors 82 and 84 to a first operational amplifier 86. Amplifier 86 is a low-drift, moderate speed operational amplifier capable of providing an output that settles to within a 0.1 percent in less than 4 milliseconds when excited with a 12-volt, 8-millisecond supply pulse. As discussed in more detail below, in the exemplary embodiment under consideration, the excitation pulses are supplied at a one pulse per second rate as controlled by the 1 Hz reference clock of FIG. 3. Amplifier 86, whose output is connected to FET switch 34, includes associated circuitry comprising resistors 88, 90, 92, 94 and 96, potentiometer 98 and capacitor 100.

Continuing the circuit description, a further operational amplifier 102, and associated capacitors 104 and 106, function as a sample and hold buffer amplifier. Two further key components, capacitors 108 and 110, which are connected as shown, function as so-called "flying" capacitors; more particularly, capacitor 108 serves to control the transfer of power to amplifier 86 and capacitor 110 serves to control the transfer of thermocouple signal from amplifier 86 to output sample and hold amplifier 102.

Considering the operation of the circuitry described above and referring to FIGS. 4(a) and 4(d) together with FIGS. 2 and 3, the oscillator circuitry of FIG. 3, operating at a frequency of 1 Hz, produces reference clock shown in FIG. 4(a) used in timing the two switch timing phases of the invention. The first phase, referred to as the isolated measurement phase, occurs at the trailing or falling edge of the corresponding clock pulse, as indicated in FIG. 4(b). In particular, in the specific example under consideration, an eight millisecond switch drive pulse is produced at input terminal 40 of the isolation amplifier circuit of FIG. 2 which turns "on", i.e., "closes", optical FET switches 30 to 34. It is noted that it is only during this first phase of the 1 second clock period (1 Hz clock) that the switches 30 to 34 are turned "on". As can be seen from FIG. 2, switches 30 and 31, when turned "on", connect power "flying" capacitor 108 to the $+V_s$ and $-V_s$ power input terminals (pins 7 and 4) of amplifier 86. Further during this same eight millisecond period, the output of amplifier 86 is switched to "flying" capacitor 110 by means of switches 32 and 34, as illustrated. All other switches (i.e., switches 35 to 39) are open during this period except for switch 33 and the purpose thereof is to provide isolation by shunting the node or junction between FET switches 37 and 38, thereby bypassing any error inducing transient charge to ground and thus diverting the charges away from "hold" capacitor 104 associated with amplifier 102.

The second phase, referred to as the sample and hold phase or input power phase, begins one millisecond after the end of the first phase, at which time a further drive pulse of eight millisecond duration is generated which turns "on" switches 35 to 39. These switches are off ("open") during the remainder of the 1 second clock period. During this second phase, switches 35 and 36 connect the $+12$ volts at the power supply to "flying" capacitor 108 for recharging of that capacitor. In addition, switches 37, 38 and 39 transfer the signal voltage stored on the second "flying" capacitor 110 to hold capacitor 104 associated with high input resistance buffer amplifier 102.

The circuit of FIG. 2 provides isolation by means of optically driven FET switches 33 and 35 to 39 which, when switched off, provide up to $10^{10}$ ohms of isolation resistance for a voltage range of $\pm 300$ volts, thereby acheiving high common rejection (120 dB) during the first phase during which a temperature measurement is being made.

Circuit efficiency is achieved by employing a very low duty cycle, viz., 0.08 for amplifier 86 and 0.08 for the drive for the FET switches 30 to 39 in the specific example being considered. The overall current requirement for an exemplary isolated six-amplifier system is about 3 mA from a 24-volt source. The switch drive currents for each switch of the two LED switch circuits (switches 30 to 34 and switches 35 to 39) are 5 mA at a 0.08 duty cycle, which equates to an average current of 80 microamperes. Amplifiers 86 and 102 are, as stated, low-power types and require, in the exemplary embodiment under consideration, 300 microamperes and 150 microamperes, respectively.

Although the present invention has been described relative to specific exemplary embodiments thereof, it will be understood by those skilled in the art that variations and modifications can be effected in these exemplary embodiments without departing from the scope and spirit of the invention.

I claim:

1. In a sensing system for determining the bed temperature profile of the bed of a stirred, fixed-bed gasifier including a plurality of temperature sensors for sensing the bed temperature at different levels therein, transmitter means for transmitting data based on the outputs of said sensors, and a battery-based power supply for powering said system, an isolation amplifier system for amplifying the outputs of said sensors, said isolation amplifier system comprising a plurality of isolation amplifier circuits and said isolation amplifier circuits each comprising an isolation amplifier connected to a said sensor, first capacitor means for, in operation, controlling the application of power from said power supply to said isolation amplifier, output sample and hold means connected to said transmitter means, second capacitor means for, in operation, controlling the transfer of the output of said isolation amplifier to said sample and hold means, and timing and control means for activating said first and second capacitor means in a predetermined timed sequence.

2. An isolation amplifier system as claimed in claim 1 wherein said isolation amplifier comprises an operational amplifier having first and second power inputs and said first capacitor means comprises a first capacitor included in a power circuit connected between the power inputs of said operational amplifier and switching means, controlled by said timing and control means, for controlling opening and closing of said power circuit.

3. An isolation amplifier system as claimed in claim 2 wherein said second capacitor means comprises a second capacitor connected in a further circuit connected between said operational amplifier and said sample and hold means in shunt with the output of said operational amplifier, and further switching means, controlled by said timing and control means, for controlling opening and closing of said further circuit.

4. An isolation amplifier system as claimed in claim 3 wherein said sample and hold means comprises a further operational amplifier and a hold capacitor connected to one input of said further operational amplifier.

5. An isolation amplifier system as claimed in claim 4 wherein said further switching means includes a switch, connected to ground in shunt with said hold capacitor, for bypassing to ground any charge on said hold capacitor produced by a switching transient.

6. An isolation amplifier system as claimed in claim 4 wherein each of said switching means comprises a light activated electronic switch controlled by a light source activated by said timing and control means.

7. An isolation amplifier system as claimed in claim 6, wherein said light activated switch comprises a light-activated field effect transistor and said light source comprises a light emitting diode.

8. An isolation amplifier system as claimed in claim 1 wherein said timing and control means comprises means for generating a low duty cycle pulse which determines the time period during which power is applied to said isolation amplifier.

9. In a sensing system for determining the bed temperature profile of the bed of a stirred, fixed-bed gasifier including a plurality of thermocouples for sensing the bed temperature at different levels therein, telemetry means for transmitting data based on the outputs of said thermocouples to a remote location, and a battery-based power supply for powering said system, an isolation amplifier system for amplifying the outputs of said thermocouples, said isolation amplifier system comprising a plurality of isolation amplifier circuits and said isolation amplifier circuits each comprising an isolation operational amplifier connected to the output of a said thermocouple and including first and second power inputs; a timing and control circuit; and capacitor means for, responsive to said timing and control circuit, controlling the application of power from said power supply to said isolation amplifier, said capacitor means comprises a capacitor included in a power circuit connected between said power inputs of said operational amplifier and switching means, controlled by said timing and control circuit, for controlling opening and closing of said power circuit.

10. An isolation amplifier system as claimed in claim 9 further comprising output sample and hold means having an output connected to said telemetry system and further capacitor means for, responsive to said timing and control circuit, controlling the transfer of the output of said isolation amplifier to sample and hold means, said further capacitor means comprising a further capacitor connected in a further circuit connected between said operational amplifier and said sample and hold means in shunt with the output of said operational amplifier, and further switching means, controlled by said timing and control circuit, for controlling opening and closing of said further circuit.

11. An isolation amplifier system as claimed in claim 10 wherein said sample and hold means comprises a further operational amplifier and a hold capacitor connected to one input of said further operational amplifier.

12. An isolation amplifier system as claimed in claim 11 wherein each of said switching means comprises a light activated electronic switch controlled by an electronic light source activated by said timing and control circuit.

13. An isolation amplifier system as claimed in claim 12, wherein said light-activated switch comprises a light-activated field effect transistor and said light source comprises a light emitting diode.

14. An isolation amplifier system as claimed in claim 9 wherein said timing and control circuit comprises means for generating a low duty cycle pulse which determines the time period during which power is applied to said isolation amplifier.

15. An isolation amplifier system as claimed in claim 11 wherein the first-mentioned switching means includes a switch, connected to ground in shunt with said hold capacitor, for bypassing to ground any charge on said hold capacitor produced by a switching transient.

16. In a sensing system for determining the bed temperature profile of the bed of a stirred, fixed-bed gasifier including a plurality of temperature sensors for sensing the bed temperature at different levels therein, transmitter means for transmitting output data based on the outputs of said sensors to a remote operator station, and a power supply comprising a battery, an isolation amplifier system for amplifying the outputs of said sensors, said isolation amplifier system comprising a plurality of isolation amplifier circuits, and said isolation amplifier circuits each comprising an isolation amplifier connected to a said sensor, first capacitor means for, in operation, controlling the time during which said isolation amplifier produces an output, sample and hold means connected to said transmitter means, second capacitor means, including a shunt capacitor, for, in operation, controlling the transfer of the output of said isolation amplifier to said sample and hold means, and timing and control means for controlling the operation of said first and second capacitor means so that said first and second capacitor means are activated in a predetermined timed sequence.

17. An isolation amplifier system as claimed in claim 16 wherein said isolation amplifier comprises an operational amplifier having first and second power inputs and said first capacitor means comprises a further capacitor included in a power circuit connected between the power inputs of said operational amplifier and switching means, controlled by said timing and control means, for controlling opening and closing of said power circuit.

18. An isolation amplifier system as claimed in claim 17 wherein the capacitor of said second capacitor means is connected in a further circuit connected between said operational amplifier and said sample and hold means in shunt with the output of said operational amplifier, and said system comprises further switching means, controlled by said timing and control means, for controlling opening and closing of said further circuit.

19. An isolation amplifier system as claimed in claim 18 wherein said sample and hold means comprises a further operational amplifier and a hold capacitor connected to one input of said further operational amplifier.

20. An isolation amplifier system as claimed in claim 19 wherein the first-mentioned switching means includes a switch, connected to ground in shunt with said hold capacitor, for bypassing to ground any charge on said hold capacitor produced by a switching transient.

* * * * *